US009691192B2

(12) United States Patent
Chander et al.

(10) Patent No.: US 9,691,192 B2
(45) Date of Patent: Jun. 27, 2017

(54) METHOD AND APPARATUS FOR RECALL NOTIFICATION HANDLING

(75) Inventors: Bala Chander, Canton, MI (US); Robin J. Stiyer, Grosse Pointe Farms, MI (US); Michael Daniel Shane, Detroit, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/437,986

(22) Filed: Apr. 3, 2012

(65) Prior Publication Data

US 2013/0260723 A1 Oct. 3, 2013

(51) Int. Cl.
*G06Q 30/02* (2012.01)
*G07C 5/00* (2006.01)
*G07C 5/08* (2006.01)

(52) U.S. Cl.
CPC ........... *G07C 5/008* (2013.01); *G07C 5/0825* (2013.01)

(58) Field of Classification Search
CPC ......... G06Q 30/02; G06Q 10/20; G06Q 1/091
USPC ....................................................... 705/14.25
See application file for complete search history.

(56) References Cited

U.S. PATENT DOCUMENTS

2002/0188506 A1* 12/2002 Smith ............................ 705/14
2004/0192189 A1* 9/2004 Yuhara et al. .............. 455/3.02
2005/0275515 A1 12/2005 Morris
2006/0046649 A1* 3/2006 Videtich ...................... 455/12.1
2006/0047415 A1* 3/2006 Groskreutz et al. .......... 701/201
2007/0129064 A1 6/2007 Batchik
2009/0106036 A1* 4/2009 Tamura et al. .................... 705/1
2010/0165909 A1* 7/2010 Yuhara et al. ................ 370/312
2011/0035476 A1* 2/2011 Imbimbo et al. ............. 709/222
2011/0263197 A1* 10/2011 Henry et al. ................. 455/3.06

OTHER PUBLICATIONS

Ford Motor Company, "SYNC with Navigation System," Owner's Guide Supplement, SYNC System Version 1 (Jul. 2007).
Ford Motor Company, "SYNC," Owners's Guide Supplement, SYNC System Version 1 (Nov. 2007).
Ford Motor Company, "SYNC with Navigation System," Owner's Guide Supplement, SYNC System Version 2 (Oct. 2008).
Ford Motor Company, "SYNC," Owner's Guide Supplement, SYNC System Version 2 (Oct. 2008).
Ford Motor Company, "SYNC with Navigation System," Owner's Guide Supplement, SYNC System Version 3 (Jul. 2009).
Ford Motor Company, "SYNC," Owner's Guide Supplement, SYNC System Version 3 (Aug. 2009).
Kermit Whitfield, "A hitchhiker's guide to the telematics ecosystem," Automotive Design & Production, Oct. 2003, http://findarticles.com, pp. 103.

* cited by examiner

*Primary Examiner* — William Nealon
(74) *Attorney, Agent, or Firm* — Jennifer Stec; Brooks Kushman P.C.

(57) ABSTRACT

In a first illustrative embodiment, a computer implemented method includes receiving a recall message from a remote source. The method also includes comparing the recall to stored vehicle data to determine if a recall repair has already been completed. The method further includes delivering the recall message to at least one vehicle occupant through a vehicle system, contingent on the non-completion of the recall repair.

18 Claims, 4 Drawing Sheets

METHOD AND APPARATUS FOR RECALL NOTIFICATION HANDLING

TECHNICAL FIELD

The illustrative embodiments generally relate to a method and apparatus for recall notification handling.

BACKGROUND

Often times recall information can relate to important or even safety critical aspects of a vehicle. In such cases, a manufacturer wishes to deliver the information to as many customers as possible, to ensure maximum repair of the issue. Email, phone calls, and various other communication mediums can be tapped to deliver the message. Unfortunately, the manufacturer, using any of these methods, cannot always be sure that the customer who owns the vehicle got the message, due to changes in contact information and a lack of feedback.

U.S. Pat. App. Pub. 2007/0129064 relates to "A method and system for providing an automated recall notification including receiving a recall communication instruction at a telematics unit from a call center via a wireless connection, initiating a service call to the call center from the telematics unit based on the recall communication instruction and responsive to a mobile vehicle operation, receiving a recall notification at the telematics unit, and sending a recall alert to a subscriber based on the received recall notification. A computer usable medium with suitable computer program code is employed for providing an automated recall notification."

U.S. Pat. App. Pub. 2005/0275515 relates to "A method is provided for distributing a recall notification to an automobile equipped with an in-vehicle communications system. The method comprises the steps of providing a telematics service center with identification information corresponding to the automobile, matching the identification information with the corresponding in-vehicle communications system, and wirelessly transmitting the recall notification to the in-vehicle communications system. A system for distributing a recall notification to a vehicle, and a vehicle equipped with an in-vehicle communications system are also provided to carry out the method."

Unfortunately, current systems do not provide a complete solution to existing problems with recall notification delivery and processing, and additional inventive improvements over existing systems can be made.

SUMMARY

In a first illustrative embodiment, a computer implemented method includes receiving a recall message from a remote source. The method also includes comparing the recall to stored vehicle data to determine if a recall repair has already been completed. The method further includes delivering the recall message to at least one vehicle occupant through a vehicle system, contingent on the non-completion of the recall repair.

In a second illustrative embodiment, a computer readable storage medium stores instructions that, when executed by a processor, cause the processor to perform the method including receiving a recall message from a remote source. The method further includes comparing the recall to stored vehicle data to determine if a recall repair has already been completed. Also, the method includes delivering the recall message to at least one vehicle occupant through a vehicle system, contingent on the non-completion of the recall repair.

In a third illustrative embodiment, a computer implemented method includes detecting that a primary phone is paired with a vehicle computing system (VCS). The method further includes, comparing a phone number of the primary phone to a stored primary phone number. If the phone number of the primary phone differs from the stored primary phone number the VCS asks a user for new primary contact information once a vehicle is in a parked state.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
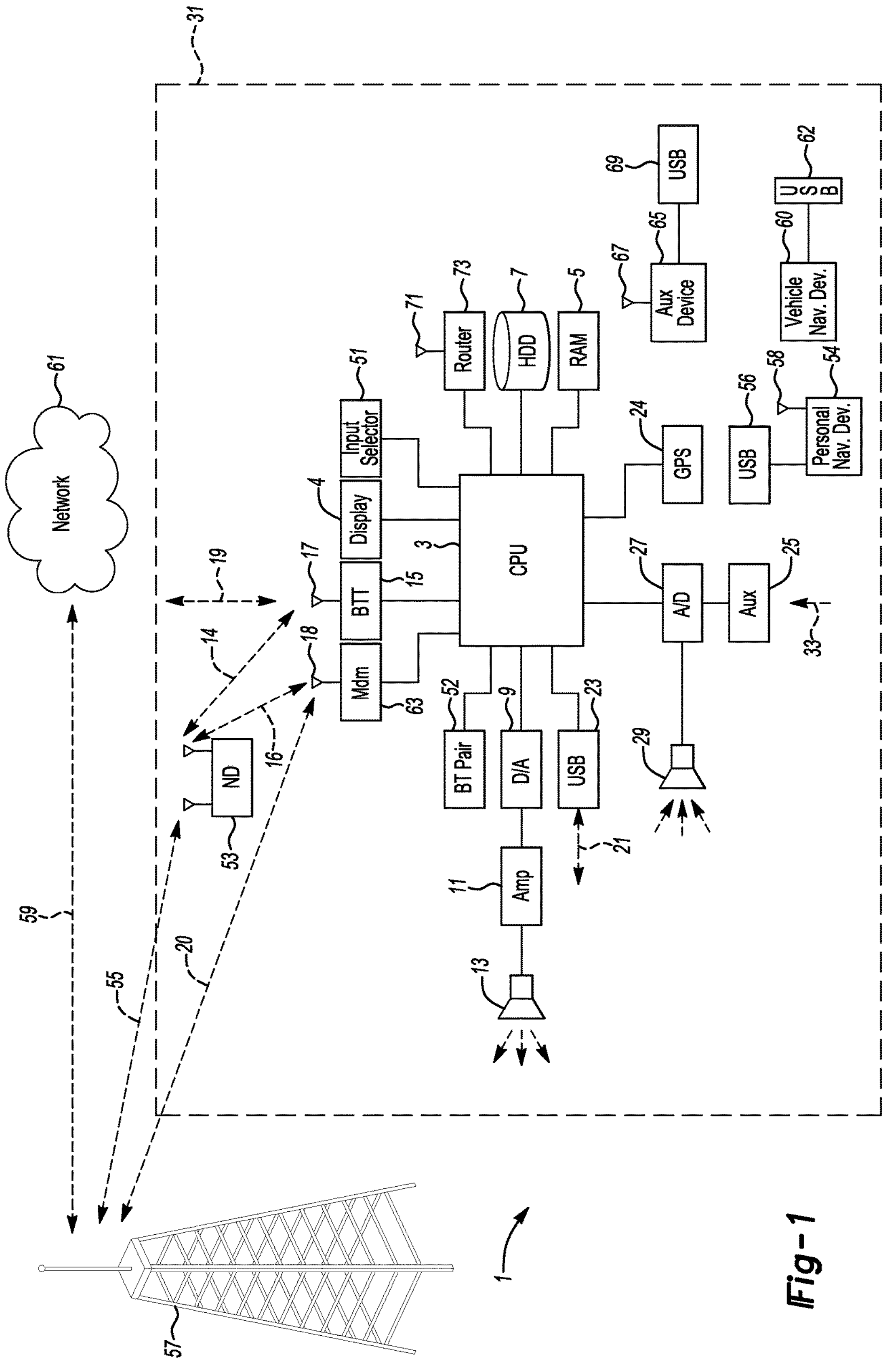
FIG. 1 shows an illustrative vehicle computing system.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touch sensitive screen. In another illustrative embodiment, the interaction occurs through, button presses, audible speech and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory.

The processor is also provided with a number of different inputs allowing the user to interface with the processor. In this illustrative embodiment, a microphone 29, an auxiliary input 25 (for input 33), a USB input 23, a GPS input 24 and a BLUETOOTH input 15 are all provided. An input selector 51 is also provided, to allow a user to swap between various inputs. Input to both the microphone and the auxiliary connector is converted from analog to digital by a converter 27 before being passed to the processor. Although not shown, numerous of the vehicle components and auxiliary components in communication with the VCS may use a vehicle network (such as, but not limited to, a CAN bus) to pass data to and from the VCS (or components thereof).

Outputs to the system can include, but are not limited to, a visual display 4 and a speaker 13 or stereo system output. The speaker is connected to an amplifier 11 and receives its signal from the processor 3 through a digital-to-analog converter 9. Output can also be made to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, or any other device having wireless remote network connectivity). The nomadic device can then be used to communicate 59 with a network 61 outside the vehicle 31 through, for example, communication 55 with a cellular tower 57. In some embodiments, tower 57 may be a WiFi access point.

Exemplary communication between the nomadic device and the BLUETOOTH transceiver is represented by signal 14.

Pairing a nomadic device 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with nomadic device 53. Alternatively, it may be desirable to include an onboard modem 63 having antenna 18 in order to communicate 16 data between CPU 3 and network 61 over the voice band. The nomadic device 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the IEEE 802 PAN (personal area network) protocols. IEEE 802 LAN (local area network) protocols include WiFi and have considerable cross-functionality with IEEE 802 PAN. Both are suitable for wireless communication within a vehicle. Another communication means that can be used in this realm is free-space optical communication (such as IrDA) and non-standardized consumer IR protocols.

In another embodiment, nomadic device 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of with Code Domian Multiple Access (CDMA), Time Domain Multiple Access (TDMA), Space-Domian Multiple Access (SDMA) for digital cellular communication. These are all ITU IMT-2000 (3G) compliant standards and offer data rates up to 2 mbs for stationary or walking users and 385 kbs for users in a moving vehicle. 3G standards are now being replaced by IMT-Advanced (4G) which offers 100 mbs for users in a vehicle and 1 gbs for stationary users. If the user has a data-plan associated with the nomadic device, it is possible that the data-plan allows for broad-band transmission and the system could use a much wider bandwidth (speeding up data transfer). In still another embodiment, nomadic device 53 is replaced with a cellular communication device (not shown) that is installed to vehicle 31. In yet another embodiment, the ND 53 may be a wireless local area network (LAN) device capable of communication over, for example (and without limitation), an 802.11g network (i.e., WiFi) or a WiMax network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (firewire), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU could be in communication with a variety of other auxiliary devices 65. These devices can be connected through a wireless 67 or wired 69 connection. Auxiliary device 65 may include, but are not limited to, personal media players, wireless health devices, portable computers, and the like.

Also, or alternatively, the CPU could be connected to a vehicle based wireless router 73, using for example a WiFi 71 transceiver. This could allow the CPU to connect to remote networks in range of the local router 73.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments particular components of the VACS may perform particular portions of a process depending on the particular implementation of the system. By way of example and not limitation, if a process has a step of sending or receiving information with a paired wireless device, then it is likely that the wireless device is not performing the process, since the wireless device would not "send and receive" information with itself. One of ordinary skill in the art will understand when it is inappropriate to apply a particular VACS to a given solution. In all solutions, it is contemplated that at least the vehicle computing system (VCS) located within the vehicle itself is capable of performing the exemplary processes.

Automobiles occasionally suffer minor or major issues with production models that require the manufacturers to issue recalls. Recalls encourage customers to take the vehicle to a dealer or authorized service provider to have the known issues fixed.

Unfortunately, there are many potential problems with contacting customers. Phone numbers change, emails stop being used, customers change addresses and if the vehicle repair is not reported, a customer could continue to receive notifications for a completed recall repair. This can unnecessarily run up reporting costs, and at the same time may irritate customers.

Many of these potential problems can be solved utilizing the illustrative embodiments in conjunction with a vehicle infotainment system. Modern infotainment systems provide a variety of multimedia functions that can deliver information to a driver. Additionally, these systems have the capability to connect to the internet for information delivery and receipt. For example, the FORD SYNC system utilizes a vehicle based computing system capable of connecting to the internet through a cellular phone or other nomadic device with internet connection capability carried in the possession of a vehicle occupant.

In conjunction with such a system, recall messages can be delivered to a vehicle occupant when a known device is present, ensuring a high likelihood of the message being delivered to a primary or responsible driver who will have the recall repair performed. Messages can also be delivered to additional occupants in these situations. Additionally or alternatively, if a driver indicates a new primary device to be paired with the vehicle, the system can recognize that a new primary contact point exists and possibly also track changes in vehicle ownership (allowing for higher success in future recall message delivery).

Figures 2A, 2B:
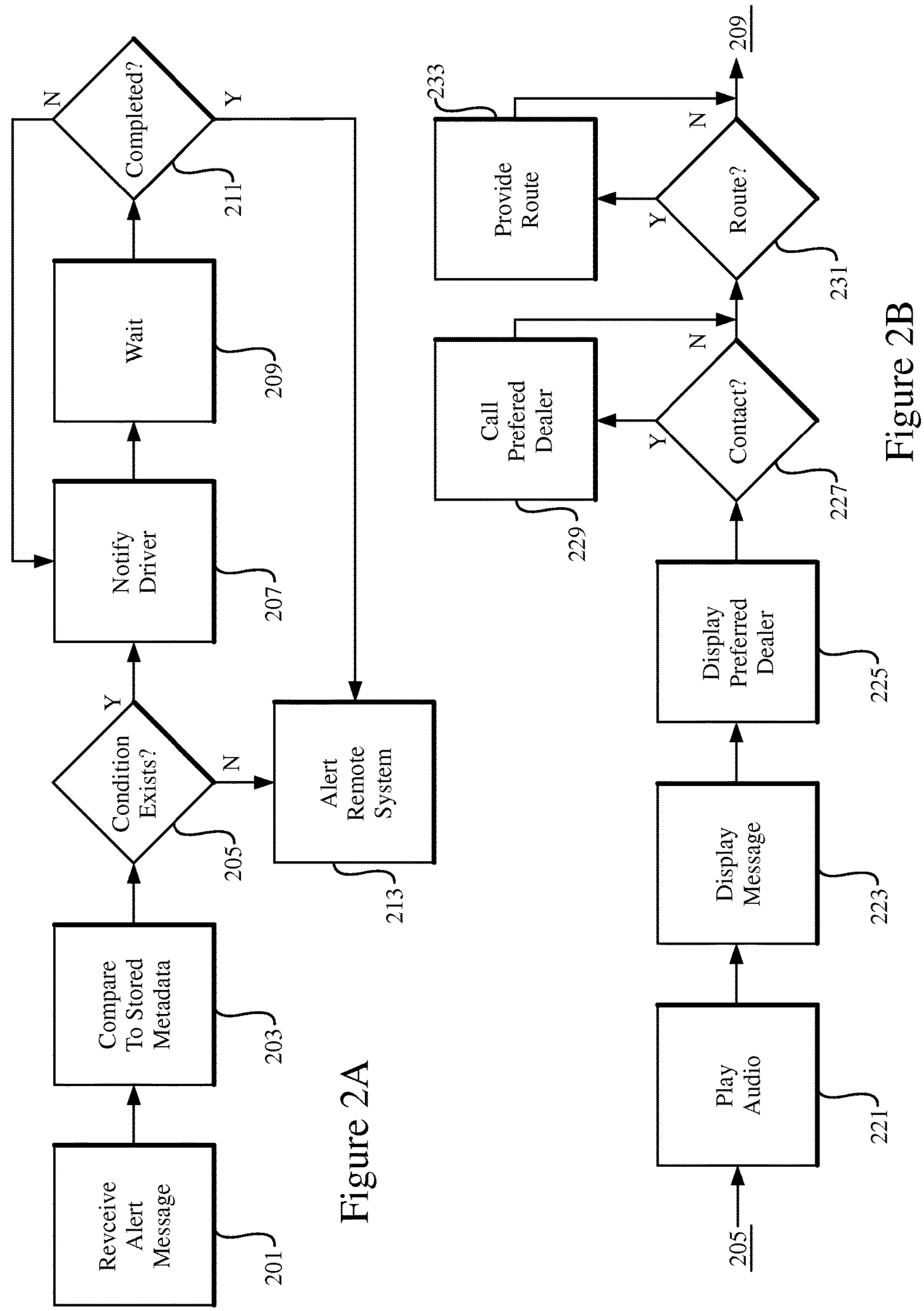
FIG. 2A shows an illustrative example of a process for handling a recall alert.
FIG. 2B shows an illustrative example of a process for recall alert delivery.

FIG. 2A shows an illustrative example of a process for handling a recall alert. In this illustrative example, the vehicle computing system receives a message alert 201. This message alert can be sent from a web server or other remote server. Stored at the remote source, for example, could be a list of vehicle VIN numbers identifying vehicle models and particular options each vehicle may be equipped with. When a part recall is needed, this list can be cross referenced to determine which vehicles currently on the roads have a part that needs repair.

The remote system may also have contact information for each owner stored in association with VIN numbers (or through some other correlatable database). This information can allow the remote server to determine which contact information should be used to deliver recall information. For example, the recall information can be delivered to a known vehicle and one or more email messages, text messages, mail notifications and other communications can be sent to the driver as desired.

In this illustrative embodiment, once the recall data is received, it can be compared to data stored on the vehicle 203. Generally, when a recall is completed, it is up to the dealer to notify a manufacturer. In this embodiment, however, upon completion of a repair, the dealer can store data relating to the repair directly on the vehicle computing system. This data can be compared to a particular recall notice to determine if notification is even necessary. If the recall has already been completed then the driver does not need to be notified.

In this embodiment, if the recall condition no longer exists (i.e., the repair has been completed or some other repair has been completed that removed the recall condition) 205, the process can skip notifying the driver. In addition, the process can notify the remote server 213 so that the server can avoid sending future communication relating to this particular problem. The communication can even include a transfer of all the data relating to the repair(s) performed by the dealer, so any other affected recall conditions can be updated as well (including future-arising recall notifications).

If the recall condition exists 205, the recall notification is delivered to the driver 207. This can be in the form of one or more of an audio message, a displayed message, a SMS message, a text message, an email (to a vehicle or user account), etc. The message can be played/displayed in a manner that is likely to ensure that the driver is at least aware of the recall notification.

After the message is delivered, the system may wait for some period of time 209 (hours, days, weeks, etc.) and then check to see if the recall was completed 211. The amount of wait time may depend, in one instance, on the severity of a recall. For example, if a recall only had to do with a cosmetic or non-safety related feature, the wait may be a week or more between message re-delivery. On the other hand, if the recall related to, for example, a braking system failure, the message may repeat every hour or even more frequently, impressing upon the driver the urgency of having the repair processed.

Once the recall has been completed 211, the process may report the completion to a remote system 213. When a dealer or other service provider completes the repair, they may upload information relating to the completion of the repair to the vehicle. The vehicle computing system receives the uploaded information from a dealer and compares the information to the recall information to determine if the completed repair meets the recall. In another instance, the system "assumes" the completed repair meets the recall if the dealer or service provider "tells" the system that the repair has met the recall through a data transfer.

FIG. 2B shows an illustrative example of a process for recall alert delivery. In one illustrative embodiment, the notification to the driver begins with playback of audio 221 and display (if a display is present) of a message relating to the recall 223. Dual play-back and display of the message helps ensure the driver receives the message, although a single delivery medium could be used if desired. In addition, information relating to a preferred dealer could be displayed/output 225.

In one example, the preferred dealer will be the dealer where the vehicle was purchased. Until a new preferred dealer is set, this dealer could be listed as the preferred dealer. In another example, once a different dealer has been used to perform a repair or service the vehicle, the utilized dealer could be set as the preferred dealer (or the user could be given an option to set the utilized dealer as the preferred dealer).

In conjunction with a display/output of the preferred dealer, the process could ask the user if they wish to contact the dealer 227. Contacting the dealer could be useful to schedule an appointment or check on repair appointment availability. If the user wishes to contact the dealer, a stored contact number can be used to call the dealer 229 through the vehicle computing system or through the user's mobile device.

Whether or not the dealer is contacted, in this embodiment, the user may also be given an option to re-route to the dealer 231. If the user elects to route the vehicle to the dealer, a new route to that dealer could be displayed or output through the system 233.

In at least one embodiment, a search for a local dealer could also be performed, if the user is outside of a given range of a preferred dealer, for example. Whether or not the search is performed could depend on, for example, a user request, or it could depend on proximity to a preferred or known dealer. A list of all previously utilized dealers could also be maintained, and the user may first search through those dealers prior to searching for a new dealer. In another example, depending on the criticality of the recall notice, a preferred range from dealer could be adjusted or a search could automatically be performed for a most-proximate dealer in order to have the vehicle off the road and in a repair bay as quickly as possible.

For example, for a low-criticality repair state, the process could provide information relating to a preferred dealer or dealers, unless the vehicle was over a hundred miles from one of the dealer locations. Then, for example, a search for a local dealer could be performed.

If the same recall was a mid-level recall, the range from dealer may be set to twenty or thirty miles. If the recall was a high level recall, the range could be set to five to ten miles, or a most-proximate dealer could be initially presented, with an option to change the dealer to a preferred dealer if the driver cannot proceed to the most proximate dealer.

Figure 3:
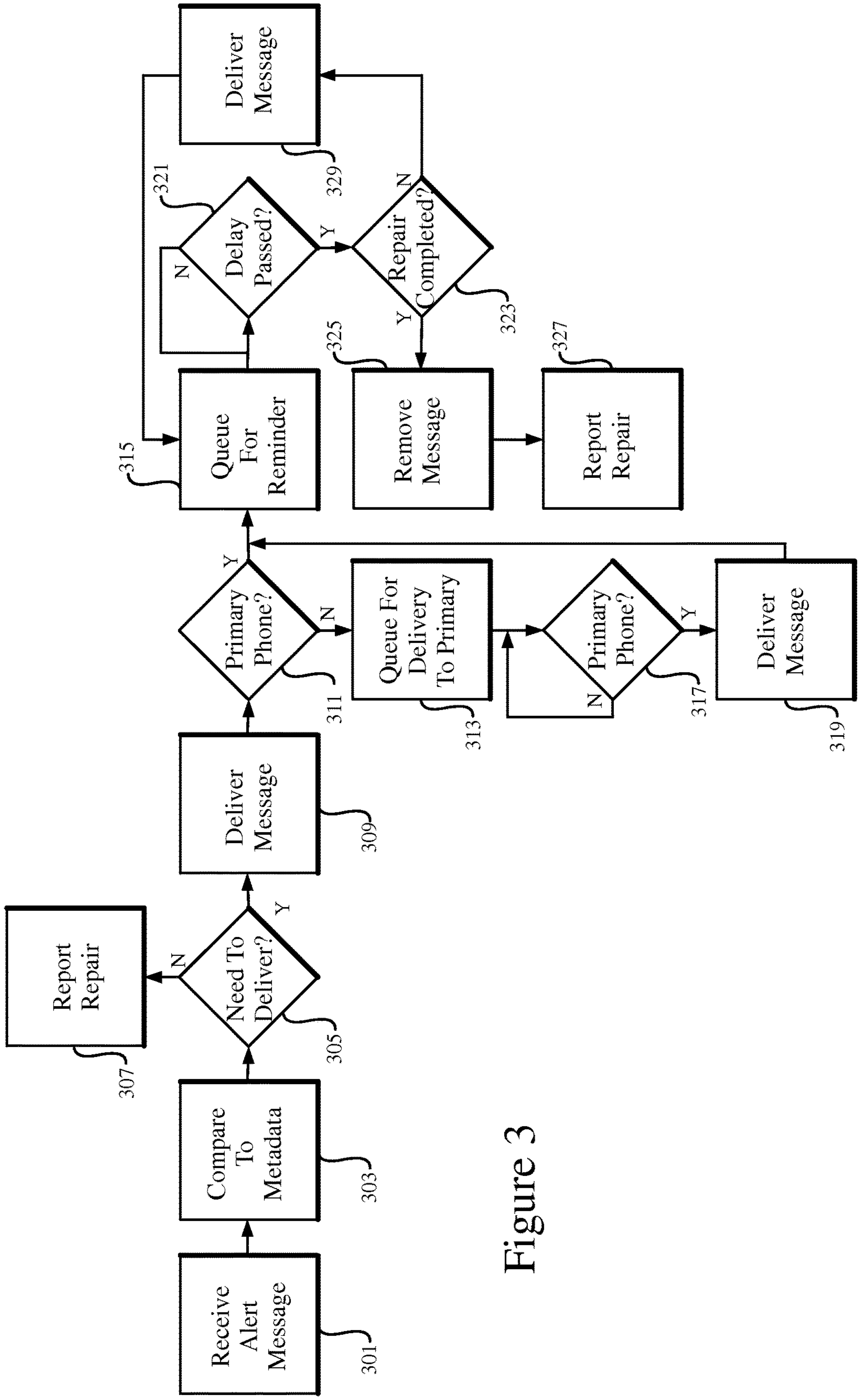
FIG. 3 shows an illustrative example of another recall alert delivery process.

FIG. 3 shows an illustrative example of another recall alert delivery process. In this illustrative embodiment, the process receives an alert message from a remote source 301 and compares the alert condition to data stored locally at the vehicle 303.

If there is a need to deliver the message (e.g., if the repair has not yet been performed), the process proceeds to deliver the message in a desired format at least once to a vehicle occupant 309. If there is no need to deliver the message, a repair-completed state or other information can be reported to the remote source 307.

While the process, under this implementation, will have reported the recall condition to at least one driver, it may not have been reported to the primary driver. For example, if a family of four drivers owns a vehicle for which a recall is issued, the report may not have been issued to the owner. If a child was driving the vehicle when the report came through, the child may not report the notification to an owner.

Accordingly, the process, when the notification is issued, checks to see if a primary phone is connected to the vehicle computing system 311. Although it is not a guarantee, if a primary phone is connected it is likely that the primary driver is present in the vehicle. Which means it is likely that the primary driver is aware of the notification message.

If the primary phone is not connected 311, the process queues the message for delivery to a primary phone possessor 313. At this point, once the process detects the presence of a primary phone in the vehicle 317, the message may then be delivered to who is presumably the vehicle's owner 319. Of course, this message may be delivered at a time that is far removed from when the message was first queued for re-delivery (i.e., on a different trip).

Additionally, the message is queued for delivery upon a reminder date such as with FIG. 2A 315. The reminder then spools until a suitable delay has passed 321 and then the process checks to see if the repair has been completed 323. If the repair has been completed, the message is removed from a message queue 325 and a report to the remote server is issued that the repair has been addressed.

If, on the other hand, the repair has not been completed 323, the process delivers a reminder message 329 and re-queues the message for later delivery upon a next reminder date 315.

Figure 4:
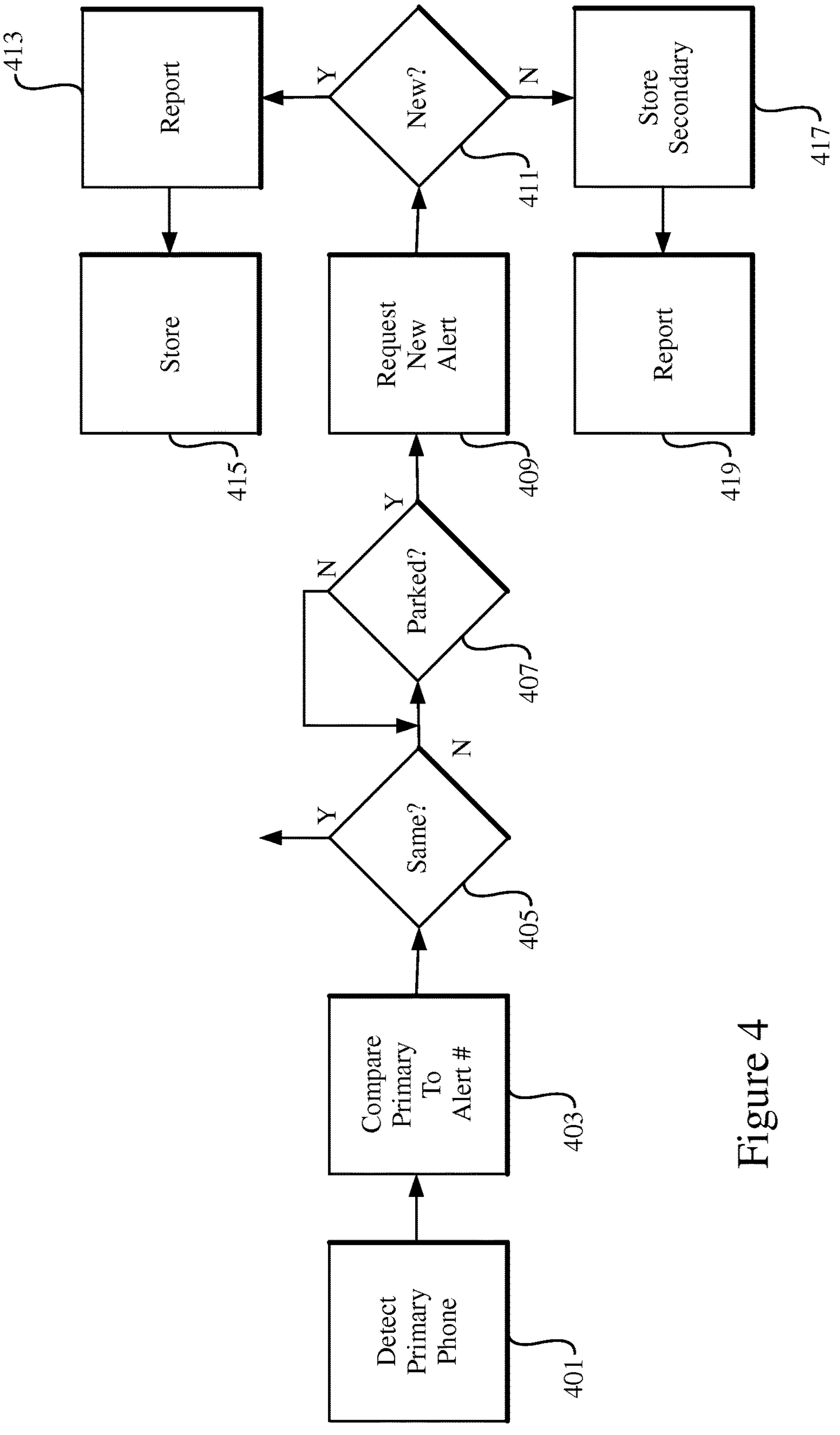
FIG. 4 shows an illustrative example of a contact number update process.

FIG. 4 shows an illustrative example of a contact number update process. In this illustrative example, the process will detect a change in a primary phone number (thus indicating that vehicle ownership may have changed, or at least that a new phone has been obtained by a vehicle owner).

Once a primary phone is detected to be paired with the vehicle 401, the process compares a phone number of the paired, primary phone with a stored alert number 403. The alert number can be used to notify users of recall alerts and other vehicle alert conditions. If the number changes, it is useful for the vehicle/manufacturer to be made aware of the change, because the number may be used for numerous reporting conditions.

If the number of the primary device is the same as the stored number 405, the process exits. If the numbers are different, the process waits until the vehicle has entered a parked state 407. This helps ensure that the user will not be interacting with the infotainment system to update a user number/profile while the vehicle is still moving. Once the vehicle is parked 407, the process requests permission to add a new alert number 409. Instead of automatically updating the alert number, in this example, the process requests addition of the number in case the user wants to keep the old alert number as a primary alert number.

If the user wishes to add a new alert number or other contact data 411, the process stores the new number and any other reported data (e.g., without limitation, address, email address, name, alternate phone numbers, etc.) and then reports this data to a remote server 415. By reporting the data to a remote server, the data can be utilized by an off-site system to contact a driver/owner for numerous reasons.

If the user does not wish to add a new alert number, the number instead can be stored as a secondary number 417. With a secondary number in place, future alerts can be sent to either or both numbers and to any additional associated contact information. Further, detection of a “primary” phone, as with respect to FIG. 3, can be done based on the presence of a phone corresponding to either of the number (e.g., the new primary phone or an old primary phone).

The secondary number can then be reported to a remote system and utilized for future reporting and or to update existing customer records.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A computer-implemented method comprising:

receiving a recall message at a vehicle computing system (VCS) from a remote source;

responsive to a determination that a predesignated primary phone is paired with the VCS, delivering the recall message through a vehicle output; and responsive to a determination that the primary phone is not paired with the VCS, queuing the message in a VCS memory for delivery until the primary phone is connected.

2. The method of claim 1, wherein the vehicle output is a vehicle audio system.

3. The method of claim 1, wherein the vehicle output is a vehicle display system.

4. The method of claim 1, further comprising:

responsive to detection of the primary phone becoming paired with the VCS, delivering a previously queued recall message through the vehicle output.

5. The method of claim 1, further comprising:

following recall message delivery, queuing the recall message for replay at a later time; and following the passage of a predetermined time period, replaying the recall message.

6. The method of claim 5, wherein the predetermined period is determined at least in part based on severity data included with the recall message.

7. The method of claim 1, further comprising:

retrieving stored preferred dealer data;

providing an option to connect a call to a preferred dealer; and providing an option to re-route to the preferred dealer.

8. The method of claim 7, further comprising:

determining a distance between the vehicle and the preferred dealer; and if the distance between the vehicle and the preferred dealer is greater than a predetermined distance, providing an alternative dealer in closer proximity to the vehicle as the preferred dealer.

9. The method of claim 8, wherein the predetermined distance varies based at least in part on severity data included with the recall message.

10. A non-transitory computer readable storage medium storing instructions that, when executed by a processor, cause the processor to perform the method comprising:

receiving a recall message from a remote source;

delivering the message through a vehicle output, responsive to determining that a predetermined primary phone is paired with a vehicle computer; and queuing the message in a vehicle memory for later delivery when the primary phone is paired with the vehicle computer, responsive to determining that the primary phone is not presently paired.

11. The computer readable storage medium of claim 10, wherein the vehicle output is a vehicle audio system.

12. The computer readable storage medium of claim 10, wherein the vehicle output is a vehicle display system.

13. The computer readable storage medium of claim 10, wherein the method further comprises:

responsive to detecting the presence of a primary phone becoming paired with the vehicle computer, playing the message through the vehicle output.

14. The computer readable storage medium of claim 10, wherein the method further comprises:

following recall message delivery, queuing the recall message for replay at a later time; and following the passage of a predetermined time period, replaying the recall message.

15. The computer readable storage medium of claim 14, wherein the predetermined period is determined at least in part based on severity data included with the recall message.

16. The computer readable storage medium of claim 10, wherein the method further comprises:

retrieving stored preferred dealer data;

providing an option to connect a call to a preferred dealer; and providing an option to re-route to the preferred dealer.

17. The computer readable storage medium of claim 16, wherein the method further comprises:

determining a distance between the vehicle and the preferred dealer; and if the distance between the vehicle and the preferred dealer is greater than a predetermined distance, providing an alternative dealer in closer proximity to the vehicle as the preferred dealer.

18. The computer readable storage medium of claim 17, wherein the predetermined distance varies based at least in part on severity data included with the recall message.

* * * * *